United States Patent [19]

Rekers et al.

[11] Patent Number: 4,496,699

[45] Date of Patent: Jan. 29, 1985

[54] PROCESS FOR POLYMERIZING HIGH MELT INDEX OLEFINS AND POLYMERIZATION CATALYSTS USED THEREFORE

[75] Inventors: Louis J. Rekers, Wyoming; Stanley J. Katzen, Cincinnati, both of Ohio

[73] Assignee: National Distillers and Chemical Corporation, New York, N.Y.

[21] Appl. No.: 440,889

[22] Filed: Nov. 12, 1982

Related U.S. Application Data

[62] Division of Ser. No. 243,677, Mar. 31, 1981, Pat. No. 4,379,075.

[51] Int. Cl.³ .................. C08F 4/24; C08F 10/00
[52] U.S. Cl. ..................... 526/105; 526/106; 526/132; 526/134; 526/352
[58] Field of Search ............ 526/105, 106, 132, 134

[56] References Cited

U.S. PATENT DOCUMENTS

| | | | |
|---|---|---|---|
| 3,476,724 | 11/1969 | Hogan et al. | 526/106 |
| 3,947,433 | 3/1976 | Witt | 526/105 |
| 3,984,351 | 10/1976 | Rekers et al. | 526/129 |
| 3,985,676 | 10/1976 | Rekers et al. | 526/129 |
| 4,252,926 | 2/1981 | Katzen et al. | 526/100 |

FOREIGN PATENT DOCUMENTS 7905445  2/1980  Netherlands .

OTHER PUBLICATIONS

U.S. Equivalent of Netherlands Reference.

Primary Examiner—Edward J. Smith
Attorney, Agent, or Firm—Kenneth D. Tremain

[57] ABSTRACT

A process is disclosed for polymerizing an olefin to provide a polyolefin of high melt index which comprises contacting the olefin with a catalyst system obtained by heat activating a supported organophosphoryl chromium compound obtained by the reaction of chromium trioxide with an organophosphorous compound having the formula:

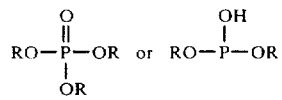

wherein R is alkyl, aralkyl, aryl, cycloalkyl, or hydrogen, but at least one R is other than hydrogen, and combining the heat activated supported material with a melt index increasing amount of at least one organoborane catalyst modifier having the formula:

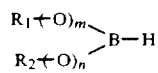

wherein m and n each is zero or 1, $R_1$ and $R_2$ are each a hydrocarbyl group of from 1 to 10 carbon atoms, or one of $R_1$ and $R_2$ is hydrogen, or together $R_1$ and $R_2$ constitute a hydrocarbyl group of from 2 to 10 carbon atoms.

6 Claims, No Drawings

PROCESS FOR POLYMERIZING HIGH MELT INDEX OLEFINS AND POLYMERIZATION CATALYSTS USED THEREFORE

This is a division of application Ser. No. 243,677, filed Mar. 13, 1981, now U.S. Pat. No. 4,379,075.

BACKGROUND OF THE INVENTION

1. Field of the Invention

The present invention is related to the polymerization of olefins and, in particular, to a process and catalyst for producing very high melt index polymers.

2. Description of the Prior Art

Peters, et al. in U.S. Pat. No. 2,892,826 describe the polymerization of olefins in the presence of diborane, other hydrides of boron, or lower boron alkyls adsorbed or absorbed on a group 5a oxide.

The use of chromium compounds in the polymerization of olefins is also well-known. U.S. Pat. Nos. 2,825,721 and 2,951,816 teach the use of $CrO_3$ supported on an inorganic material such as silica, alumina or combinations of silica and alumina, and activated by heating in reducing atmospheres, to polymerize olefins. When, however, a catalyst system of this type is used in techniques such as the well-known particle-form process, the resins produced, while useful in many applications, are unsatisfactory for others because of a deficiency in certain properties such as melt index.

Attempts to improve the properties of polyolefins produced using supported, heat activated chromium oxide catalysts have been made by adding various compounds to the supported chromium oxide prior to the heat activation thereof. Thus, U.S. Pat. No. 3,484,428 discloses adding boranes or alkyl-substituted boranes to such a catalyst, and U.S. Pat. No. 3,780,011 refers to the use of alkyl esters of boron.

It is also known to utilize other chromium compounds as catalysts for the polymerization of olefins. Such compounds include various silyl chromate and poly-alicyclic chromate esters as described, for example, in U.S. Pat. Nos. 3,324,095; 3,324,101; 3,642,749; and 3,704,287. The use of phosphorus-containing chromate esters in olefin polymerization catalysts has also been disclosed in the aforesaid U.S. Pat. No. 3,704,287; and in U.S. Pat. Nos. 3,474,080 and 3,985,676. Other such catalysts are described in commonly assigned U.S. Pat. No. 4,100,104. Commonly assigned U.S. Pat. No. 4,118,340 of Rekers claims catalysts comprising reaction products of chromium trioxide and an organoborate compound such as triethyl borate.

Certain of these catalytic materials may be employed in Ziegler-type coordination catalyst systems, or in supported form, alone or in conjunction with metallic or organometallic reducing agents such as, for example, trialkylaluminum compounds or alkylboranes. Catalyst systems incorporating supported chromium compound catalysts and organometallic reducing agents, particularly organo-aluminum compounds, are disclosed, for example, in U.S. Pat. Nos. 3,324,101; 3,642,749; 3,704,287; 3,806,500; 3,985,676; and in the aforesaid commonly assigned U.S. Pat. No. 4,100,104.

It has also been disclosed in U.S. Pat. Nos. 3,984,351 and 4,049,896, owned by the assignee of the present invention, that the properties of olefin polymers, e.g., melt indices, may be substantially improved by the use of a catalyst prepared by depositing chromium and aluminum compounds on an inorganic support material and heat-activating the supported composition in a non-reducing, preferably oxygen-containing atmosphere, at a temperature of from about 300° C. (572° F.) up to the decomposition temperature of the support. The resulting material, as preferably combined with a metallic and/or non-metallic reducing agent, e.g., a trialkylborane, provides a catalyst system capable of producing polymers having improved flow properties and shear responses in addition to increased melt indices.

For example, U.S. Pat. No. 4,184,028 discloses a process for polymerizing 1-olefins by contacting such olefin with a heat-activated catalyst system having deposited thereon a solid support material having surface hydroxyl groups, an organophosphoryl chromium reaction product of chromium trioxide and a phosphorous compound having the formula:

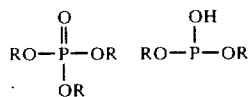

where R is alkyl, aralkyl, aryl, cycloalkyl or hydrogen, but at least one R is other than hydrogen, and an aluminum compound. In accordance with commonly assigned copending application Ser. No. 931,598 filed May 13, 1980, which has been allowed, the heat activated catalyst system of U.S. Pat. No. 4,184,028 is combined with a hydrogenated alkylborane such as trimethylborane, tripropylborane, tributylborane, trihexylborane, tridodecylborane, tetraethyldiborane, and the like, prepared by reacting the alkyl borane in a solvent with hydrogen gas at a temperature range of 90° to 130° C. and at a pressure ranging from ambient to 1,000 p.s.i. The polymerization product formed by use of this catalyst system is characterized by, inter alia, elevated melt indices, better flow properties and improved shear response.

SUMMARY OF THE INVENTION

In accordance with the present invention, it has been found that a very high melt index polymer can be produced at acceptable productivity rates by contacting at least one olefin with a catalyst system obtained by heat activating a supported organophosphoryl chromium compound and combining the heat activated supported material with a solution comprising at least one organoboron compound represented by the general formula:

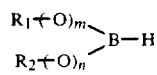

wherein m and n each is zero or 1 and $R_1$ and $R_2$ each is a hydrocarbyl group of from 1 to 10 carbon atoms or $R_1$ and $R_2$ together constitute a hydrocarbyl group of from 2 to 10 carbon atoms or one of $R_1$ and $R_2$ is hydrogen.

The chromium compound and, where present the aluminum compound, can be deposited upon the support prior to heat activating as in the catalyst preparation procedures disclosed in U.S. Pat. Nos. 3,984,351; 3,985,676; and 4,049,896, and thereafter the organoborane compound can be added to the activated material. Specifically, the heat activated supported material can be obtained by the reaction of chromium trioxide with an organophosphorous compound having the formula:

wherein R is alkyl, aralkyl, aryl, cycloalkyl, or hydrogen, but at least one R is other than hydrogen. The organoborane-containing solution may also include other boranes such as triethyl boron (TEB) or alkylaluminum compounds such as triisobutylaluminum (TIBAL) or triethylaluminum (TEA).

The alkylborane or alkylaluminum compound is mixed together with the organoborane compound prior to combining the latter with the supported material.

While slightly higher melt indices are generally associated with higher boron to chromium, B/Cr ratios, productivity rates do not similarly correspond. In aforesaid commonly assigned Ser. No. 931,598, an improvement in melt indexes were achieved with the use of an alkylborane which had been pretreated with hydrogen at elevated temperatures and pressure. By use of the present invention, however, polymer melt indices have been increased by as much as 100% and greater over the polymers produced by the process and catalyst disclosed in Ser. No. 931,598.

DESCRIPTION OF THE PREFERRED EMBODIMENTS

The inorganic support materials useful in the present invention include those normally employed for supported chromium catalysts employed in olefin polymerizations, e.g., those described in U.S. Pat. No. 2,825,721. Typically, these support materials are inorganic oxides of silica, alumina, silica-alumina mixtures, thoria, zirconia and comparable oxides which are porous, have a medium surface area, and have surface hydroxyl groups. Preferred support materials are silica xerogels or xerogels containing silica as the major constituent. Especially preferred are the silica xerogels described in U.S. Pat. Nos. 3,652,214; 3,652,215; 3,652,216; 3,978,002; and 4,053,565 each of which is incorporated by reference herein. These silica xerogels have a surface area in the range of from about 200 to about 500 m²/g and a pore volume greater than about 2.0 cc/g, a major portion of which is provided by pores having pore diameters in the range of from about 300 to about 600 Å.

The chromium containing compounds useful in the present invention are those disclosed in U.S. Pat. No. 3,985,676 and which comprise the reaction product of chromium trioxide with an organophosphorus compound. The organophosphosphorous compound and the chromium trioxide are brought together in a suitable inert solvent, e.g., cyclohexane, n-hexane, methylene chloride, carbon tetrachloride, etc. In this step in the preparation of the catalyst system, the solid $CrO_3$ is slurried in the solvent and the organophosphorus compound added. Over a period of time, e.g., about one hour, a reaction between the compounds ensues and the chromium trioxide disappears. During this period the solution becomes reddish-brown in color. It is ordinarily filtered simply to insure the absence of any unreacted solid $CrO_3$. Among the organophosphorus compounds which can be reacted with chromium trioxide to provide the organophosphoryl chromium compounds herein are the triorganophosphates and diorganophosphates including such compounds as triphenyl phosphate, tributyl phosphate, triethyl phosphate, trioctyl phosphate, trimethyl phosphate, etc. Also suitable are the mono(-dihydrogen)phosphate or phosphite and di(-hydrogen)phosphate derivatives (illustratively inclusive of monobutyl phosphate, dibutyl phosphate and monoethyl phosphite) and these materials may of course comprise mixtures. Organophosphoryl chromium reaction products are also formed with such phosphorus based compounds as phenyl phosphoric acid, diethyl ethyl phosphonate and trioctyl phosphine oxide. Preferred organophosphorus compounds can be represented by the formulas:

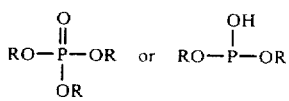

where R is alkyl, aralkyl, aryl, cycloalkyl or hydrogen. The preferred organophosphorous compounds are trialkyl phosphates such as triethyl phosphate.

Aluminum compounds which can optionally be employed in the present invention can be represented by the formula:

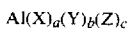

$Al(X)_a(Y)_b(Z)_c$ wherein X is R, Y is OR, and Z is H or a halogen; a is 0–3, b is 0–3, c is 0–3, and a+b+c equals 3; and R is an alkyl or aryl group having from one to eight carbon atoms.

Examples of such aluminum compounds include aluminum alkoxides such as aluminum sec-butoxide, ethylaluminum ethoxide, methylaluminum propoxide, diethylaluminum ethoxide, diisobutylaluminum ethoxide, etc.; alkyl or arylaluminum halides such as diethylaluminum chloride; arylaluminum compounds such as triphenylaluminum, aryloxyaluminum compounds such as aluminum phenoxide and mixed aryl, alkyl and aryloxy, alkylaluminum compounds.

The novel catalysts of the present invention can be prepared by depositing the organophosphoryl chromium compound and, optionally, the aluminum compound, on the inorganic support in any suitable manner such as by vapor coating or by impregnating the support with solutions of the organophosphoryl chromium compound and the aluminum compound in a suitable inert solvent which is normally an anhydrous organic solvent. Such organic solvents include aliphatic, cycloalkyl and alaryl hydrocarbons and their halogenated derivatives. A preferred organic solvent is dichloromethane. The organophosphoryl chromium compound can be applied to the support first or the aluminum compound can be applied first or the chromium and aluminum compound can be applied together. In the usual method of catalyst preparation, the support is impregnated first with the chromium containing compound and then the (optional) aluminum compound.

The most effective catalysts have been found to be those containing the chromium compound in an amount such that the amount of Cr by weight based on the weight of the support is from about 0.25 to 2.5% and preferably, from about 0.5 to 1.25%, although amounts outside of these ranges still yield operable catalysts. The aluminum compound should be added in sufficient amounts to provide from about 0.1 to 10% of aluminum by weight based on the weight of the support and preferably from about 0.5 to 5.5%, although other amounts outside of these ranges can be used to prepare operable catalysts.

After the chromium-containing compound and the aluminum compound have been deposited on the inorganic support, the support is heated in a non-reducing atmosphere, preferably in an oxygen-containing atmosphere, at a temperature above about 300° C. up to the decomposition temperature of the support. Typically, the supported compositions are heated at a temperature of from 500° to 1,000° C. The heating time may vary, for example, depending on the temperature used, from ½ hour or less to 50 hours or more. Normally, the heating is carried out over a period of 2 to 12 hours. The non-reducing atmosphere which is preferably air or other oxygen-containing gas should be dry and preferably should be dehumidified down to a few parts per million (ppm) of water to obtain maximum catalyst activity. Typically, air used in the procedure described in this application is dried to less than 2-3 ppm of water.

The following organoboranes are preferred for use in the present invention:

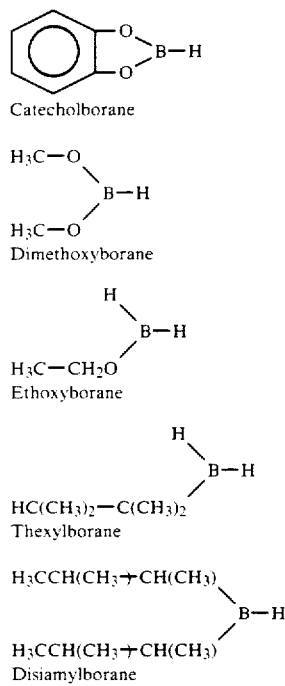

Catecholborane

H₃C—O
    \
     B—H
    /
H₃C—O

Dimethoxyborane

H
 \
  B—H
 /
H₃C—CH₂O

Ethoxyborane

H
 \
  B—H
 /
HC(CH₃)₂—C(CH₃)₂

Thexylborane

H₃CCH(CH₃)—CH(CH₃)
                  \
                   B—H
                  /
H₃CCH(CH₃)—CH(CH₃)

Disiamylborane

The selected organoborane is optionally combined in solution with another borane such as TEB, or with an alkylaluminum compound such as triisobutylaluminum or triethylaluminum, and thereafter applied to a heat treated supported organophosphoryl chromium compound, and optionally, an aluminum containing compound, as previously described. Combination of these components can be effected prior to feeding the catalyst to an olefin polymerization reactor or the components can be fed separately to the olefin polymerization reactor with mixing taking place therein.

In proportioning the amount of organoborane compound (and alkylborane, if any) to the amount of chromium compound used in the catalyst systems of the present invention, fairly wide latitude is available, but some guidelines have been established consistent with good yield, favorable polymer properties and economic use of materials. For example, in the use of catecholborane together with optional TEB, and an amount of chromium compound sufficient to yield about 1% Cr by weight of the support, the parameters set forth below are representative. The atomic ratios are based upon a calculation of the boron in the solution versus the chromium content present in the chromium compound on the support.

Based upon a catalyst composition containing about 1% Cr based upon weight of the support, the preferred total amount of borane-containing compounds is that amount sufficient to yield a B/Cr atomic ratio of about 2.7/1. The preferred range of atomic ratios of B to Cr is from about 0.1/1 to about 10/1. The overall practicable limits, in terms of a B/Cr ratio, are from about 0.01/1 to about 20/1.

With respect to optional aluminum-containing components based upon a catalyst composition containing about 1% Cr by weight of the support, the preferred amount for use therewith, e.g., triisobutylaluminum, is about 11.4% by weight and equivalent to an Al/Cr atomic ratio of about 3/1. The preferred range of atomic ratios of Al to Cr is from about 0.5/1 to about 3/1, or from about 1.9% to about 30% by weight triisobutylaluminum. The overall practicable limits of triisobutylaluminum in terms of the Al/Cr atomic ratio are from about 0.1/1 to about 20/1, and in terms of weight are from about 0.4% to about 75% by weight.

Identical considerations and procedures are involved in the double activation method of preparing the catalysts referred to above with the exception that the aluminum compound is first deposited upon the support and heat activated followed by deposition and activation of the chromium compound. Typically, the aluminum compound-coated support is heat activated at temperatures of from about 90° C. to about 1100° C., preferably at from about 260° C. to about 820° C., and activation is completed by treating the chromium compound-coated support at temperatures within the range of from about 430° C. to about 1,100° C., best results having been obtained by activation at temperatures of from about 850° C. to about 1,000° C.

As indicated above, the catalyst compositions of this invention are suitable for use in conventional olefin polymerization and copolymerization processes, in particular for 1-olefins having 2-8 carbon atoms such as ethylene, propylene, butylene, and their mixtures, which are effected under temperature and pressure conditions generally employed in the art, e.g., temperatures of from about 40° C. to about 200° C. and preferably from about 70° C. to 110° C., and pressures of from 200 to 1,000 psig and preferably from 300 to 800 psig, as are used in slurry or particle form procedures.

Hydrogen can be supplied to the reaction zone as a modifier, for example, at a partial pressure of 30 to 120 psi, and is preferred for optimization of results.

A series of olefin polymerizations, the results of which are given below, were carried out to demonstrate the ability of the novel catalyst systems of the present invention to produce polymers having very high melt indexes. The polymerizations were carried out in a stirred autoclave using isobutane as a diluent. The catalyst is added along with the isobutane solvent to a stirred one gallon autoclave. The contents of the stirred autoclave are then heated to the polymerization temperature, i.e., 88° to 108° C. Hydrogen, if used, is added and then the ethylene is added to give 10 mol % in the liquid phase at which time the total pressure will be from about 425 to 455 psig. Polymerization begins almost immediately as noted by the ethylene coming from the ethylene demand supply system to the reactor. After approximately one hour of polymerization, the reaction is terminated by dropping the reactor contents into a pressure let-down system. The melt index (M.I.) of the polymers prepared was determined using ASTM D-1238 (condition E).

The catalysts used in the polymerization runs were prepared in accordance with the following catalyst preparation procedures:

CATALYST SYSTEM PREPARATION PROCEDURE

A. Polypor silica xerogel having a pore volume of about 2.5 cc/g prepared in accordance with U.S. Pat. No. 3,652,215 was added to a 2000 ml, three-neck round bottom flask equipped with a stirrer, nitrogen inlet and y-tube with water condenser. A nitrogen atmosphere was maintained during the coating operation. Dichloromethane was then added to the flask containing the silica gel and stirring was commenced to insure uniform wetting of the gel. A dichloromethane solution of the reaction product of $CrO_3$ and triethyl phosphate prepared as described in U.S. Pat. No. 3,985,676 was then added to the flask in sufficient quantity to provide a dry coated catalyst containing about 1% by weight of Cr. The supernatant liquid was removed by filtration and the coated gel was dried in a rotary evaporator at 60° C. and with 29 inches of Hg vacuum.

B. Dichloromethane was added to a similar flask as used in step A and while maintaining a nitrogen atmosphere stirring was commenced. To the flask was added the supported chromium composition prepared in step A above. A solution of dichloromethane and aluminum sec-butoxide was prepared in a pressure equalizing dropping funnel and the funnel attached to the stirred flask. The aluminum sec-butoxide solution was gradually added to the flask at the rate of 10 grams of solution per minute. After the addition of the solution was complete the slurry in the flask was stirred for about 1 hour. The supernatant liquid was removed by filtration and the coated gel was dried in a rotary evaporator at temperatures up to about 60° C. and 29 inches Hg vacuum. The amount of aluminum compound added depends on the % aluminum desired for the production of olefin polymers having specific properties necessary for certain end use applications.

C. To heat activate the catalyst composition prepared in step B, the supported catalyst was placed in a cylindrical container and fluidized with dry air at 0.20 feet per minute lineal velocity while being heated to a temperature of 900° C. and held at this temperature for six hours. The activated supported catalyst was recovered as a powder.

D. Independent of the above procedure, a one ounce serum-capped bottle was dried in an oven and purged with $N_2$. A 15% by weight solution of TEB in hexane was weighed out into the purged bottle. To this solution, a known amount of catecholborane (liquid) was added using a needle and syringe. Based on the weights of catecholborane and 15% TEB, the mole ratios of catecholborane to TEB can be calculated. In Table I the solutions of catecholborane/TEB used are listed with their weights and percentages.

TABLE 1

| | Catecholborane/TEB Solutions | | | | |
|---|---|---|---|---|---|
| Solution No. | gm 15% TEB | gm Catechol-borane | % TEB | % Catechol-borane | Catecholborane (mole)/TEB |
| 1 | 6.95 | 1.15 | 12.8 | 14.2 | 0.90 |
| 2 | 45.0 | 4.72 | 13.6 | 9.5 | 0.57 |
| 3 | 15.2 | 1.1 | 14.0 | 6.8 | 0.40 |
| 4 | 19.1 | 0.82 | 14.4 | 4.1 | 0.23 |
| 5 | 17.2 | 0.37 | 14.7 | 2.1 | 0.12 |

The solutions prepared as indicated above were added to the polymerization reactor with the supported catalyst component to form a catalyst system.

Table 2 shows the capability of the catecholborane/TEB system to form high melt index polymers at reactor conditions of 210° F. and 30 psi $H_2$.

TABLE 2

EFFECT OF CATECHOLBORANE/TEB CATALYST SYSTEM ON MELT INDEX OF RESULTANT POLYMER

| Solution No. | Catecholborane TEB | Productivity (g PE/g cat-hr) | MI | HLMI | MIR |
|---|---|---|---|---|---|
| 1 | 0.90 | 290 | 86 | 2408 | 27.7 |
| 2 | 0.57 | 214 | 81 | 1860 | 22.7 |
| 3 | 0.40 | 214 | 80 | 2090 | 26.0 |
| — | TEB | 522 | 9.1 | 743 | 81.8 |

| Reactor Conditions | |
|---|---|
| Temperature | 210° F. |
| $H_2$ | 30 psi |
| Ethylene | 10 mole % |
| B/Cr Ratio | 3/1, based on TEB |
| Catalyst Activation | 1650° F. for 6 hrs. |

When catecholborane was present in the catalyst system, melt indices of 80-86 were consistently obtained. These melt indices are considerably higher than the standard run using TEB alone. Furthermore, when using the catecholborane solutions, the polymer melt index ratios (MIR) were much lower than the standard TEB polymerizations indicating a narrow molecular weight distribution (MWD).

Additional polymerizations were made using solutions having catecholborane/TEB mole ratios which were comparatively lower. The results of these runs in which the reactor temperature was 190° F. are shown in Table 3.

TABLE 3

EFFECT OF CATECHOLBORANE/TEB CATALYST SYSTEM ON MELT INDEX OF RESULTANT POLYMER

| Solution No. | Catecholborane/ TEB | $H_2$ (psi) | Productivity (g PE/g cat-hr) | MI | HLMI | MIR |
|---|---|---|---|---|---|---|
| 4 | 0.23 | 30 | 210 | 16 | 1049 | 62.8 |
| 4 | 0.23 | 120 | 141 | 63 | 2816 | 44 |
| 5 | 0.12 | 30 | 297 | 14 | 1373 | 96 |
| 5 | 0.12 | 120 | 264 | 55 | 2968 | 53 |
| — | TEB | 30 | 547 | 1.3 | 209 | 155 |

| Reactor Conditions | |
|---|---|
| Temperature | 190° F. |
| B/Cr Ratio | 3/1 based on TEB |
| Ethylene | 10 mole % |
| Catalyst Activation | Approximately 900° C. for 6 hrs. |

High melt indices were obtained even with the low ratios of catecholborane/TEB, and again lower MIR values were experienced indicating narrower MWD with the use of the catecholborane solutions.

Combination additives for catalyst systems that produce high melt index polymers by use of the organoborane compounds described herein are not limited to alkylboranes, but may also include alkylaluminum compounds such as triisobutylaluminum (TIBAL) and triethylaluminum (TEA). Accordingly, additional polymerization tests were made using the same supported catalyst as described in steps A through C above, but with additive solutions prepared with alkylaluminum compounds according to the procedure set forth in step D.

TABLE 4

| | | Catecholborane/TIBAL Solutions | | | |
|---|---|---|---|---|---|
| Solution No. | gm 15% TIBAL | gm Catecholborane in solution | % TIBAL | % Catecholborane | Catecholborane/TIBAL |
| 6 | 12.6 | 0.24 | 13.4 | 1.7 | 0.21 |
| 7 | 12.4 | 0.14 | 14.0 | 1.1 | 0.13 |
| 8 | 12.6 | 0.063 | 14.6 | 0.49 | 0.055 |

Table 4 shows the prepared solutions of catecholborane/TIBAL with their weights and percentages. These solutions were introduced into the polymerization reactor together with the supported catalyst component to form the catalyst system. Results of the polymerization runs at reactor condition of 190° F. and the $H_2$ pressure at 30 psi are shown in Table 5.

TABLE 5

EFFECT OF CATECHOLBORANE/TIBAL CATALYST SYSTEM ON MELT INDEX OF RESULTANT POLYMER

| Solution No. | Catecholborane/TIBAL | Productivity (g PE/g cat-hr) | MI | HLMI | MIR |
|---|---|---|---|---|---|
| 6 | 0.21 | 292 | 3.1 | 309 | 99 |
| 7 | 0.13 | 359 | 7.7 | 673 | 88 |
| 8 | 0.055 | 461 | 3.4 | 289 | 85 |
| — | TIBAL | 733 | 0.59 | 64 | 109 |
| — | TEB | 547 | 1.3 | 202 | 155 |

| Reactor Conditions | |
|---|---|
| Temperature | 190° F. |
| Al/Cr Ratio | about 3/1 |
| $H_2$ | 30 psi |
| Ethylene | 10 mole % |
| Catalyst Activation | Approximately 900° C. for 6 hrs. |

Table 5 shows that even Catecholborane/TIBAL solutions having low concentrations of catecholborane result in a polymer with a comparatively higher melt index than polymers produced using 15% TIBAL or 15% TEB solutions in the catalyst system.

Catecholborane/TEA (triethylaluminum) solutions were prepared for use in the catalyst system described herein in accordance with the value shown in Table 6.

TABLE 6

| | | Catecholborane/TEA Solutions | | | |
|---|---|---|---|---|---|
| Solution No. | gm 25% TEA | gm Catecholborane | % TEA | % Catecholborane | Catecholborane/TEA |
| 9 | 11.1 | 0.055 | 24.3 | 0.48 | 0.019 |
| 10 | 14.0 | 0.081 | 24.2 | 0.56 | 0.022 |
| 11 | 10.7 | 0.161 | 22.9 | 13.8 | 0.057 |

Polymerization reactor conditions and resulting polymer properties are shown in Table 7. Noticeably, the melt indices of the resultant polymers increase markedly as the Catacholborane/TEA ratio increases.

TABLE 7

Bench Scale Evaluation of Catecholborane/TEA Solutions as Modifiers

| Solution No. | Catecholborane/TEA | $H_2$ (psi) | Productivity (g PE/g cat-hr) | MI | MIR |
|---|---|---|---|---|---|
| 9 | 0.019 | 30 | 610 | 1.2 | 108 |
| 10 | 0.022 | 30 | 620 | 2.0 | 98 |
| | | 120 | 628 | 28.8 | 59 |
| 11 | 0.057 | 30 | 527 | 6.3 | 86 |
| | | 120 | 572 | 9.6 | 92 |

| Reactor Conditions | |
|---|---|
| Temperature | 190° F. |
| Al/Cr Ratio | about 3/1 |
| Ethylene | 10 mole % |
| Catalyst Activation | approximately 900° C. for 6 hrs. |

While the mechanism responsible for the formation of such high melt index polymers using the present system is not known, the use of organoborane compounds of the type described herein results in polymers having consistently higher melt indexes. In tests performed using thexylborane solutions, polymer products having significantly increased melt indices were formed in polymerization reactions similar to the ones shown above. These results are shown in Table 8.

TABLE 8

Bench Scale Evaluation of Thexylborane Solutions as Modifier

| Boron Compound | $H_2$ (psi) | Productivity (g PE/g cat-hr) | MI | HLMI | MIR |
|---|---|---|---|---|---|
| Thexylborane | 30 | 501 | 2.4 | 360 | 150 |
| | 120 | 382 | 12.3 | 1316 | 107 |
| Thexylborane/ TEB[1] | 30 | 324 | 3.3 | 462 | 140 |
| | 120 | 318 | 2.1 | 269 | 128 |
| TEB | 30 | 364 | 0.60 | 102 | 170 |
| | 120 | 286 | 1.14 | 170 | 149 |

| Reactor Conditions | |
|---|---|
| Temperature | 190° F. |
| Ethylene | 10 mole % |
| Catalyst Activation | Approximately 900° C. for 6 hrs. |

[1]Mixture of thexylborane/TEB at mole ratios of 1/1.

The polymerization systems employing the thexylborane-containing compounds produced polymers with a melt index nearly twice as much as the TEB solution and in one case the melt index was ten times greater for the polymer produced by use of thexylborane.

While there have been described what are presently believed to be the preferred embodiments of the invention, those skilled in the art will realize that changes and modifications can be made thereto without departing from the spirit of the invention, and it is intended to claim all such changes and modifications as fall within the true scope of the invention.

What is claimed is:

1. A process for the polymerization of an olefin to provide a polyolefin of high melt index which comprises contacting the olefin with a catalyst system obtained by heat activating a supported organophosphoryl chromium compound obtained by the reaction of chromium trioxide with an organphosphorous compound having the formula:

wherein

R is alkyl, aralkyl, aryl, cycloalkyl, or hydrogen, but at least one R is other than hydrogen, and combining the heat activated supported material with a melt index increasing amount of at least one organoborane catalyst modifier having the formula:

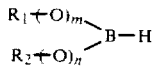

wherein m and n each is zero or 1, with the proviso that m and n are not both zero, $R_1$ and $R_2$ are each a hydrocarbyl group of from 1 to 10 carbon atoms, or one of $R_1$ and $R_2$ is hydrogen, or together $R_1$ and $R_2$ constitute a hydrocarbyl group of from 2 to 10 carbon atoms.

2. The process of claim 1 wherein said organoborane is combined with an alkyl borane compound.

3. The process of claim 2 wherein the alkyl borane compound is triethyl borane.

4. The process of claim 3 wherein the organoborane is combined with an alkyl aluminum compound.

5. The process of claim 4 wherein the alkyl aluminum compound is triethyl aluminum or triisobutyl aluminum.

6. The process of claim 1 wherein the organoborane is selected from the group consisting of catechol borane, dimethoxy borane and ethoxy borane.

* * * * *